US012351676B2

(12) United States Patent
Shin et al.

(10) Patent No.: US 12,351,676 B2
(45) Date of Patent: Jul. 8, 2025

(54) NON-MIXED AMPHIPHILIC THERMOPLASTIC POLYURETHANE, METHOD FOR PRODUCING SAME, AND IMPLANTABLE MEDICAL DEVICE INCLUDING SAME

(71) Applicant: I-sens, Inc., Seoul (KR)

(72) Inventors: Hyunseo Shin, Seoul (KR); Bona Yang, Seoul (KR); Young Jea Kang, Seoul (KR); Geunhee Kang, Seoul (KR)

(73) Assignee: I-SENS, INC., Seoul (KR)

( * ) Notice: Subject to any disclaimer, the term of this patent is extended or adjusted under 35 U.S.C. 154(b) by 421 days.

(21) Appl. No.: 17/780,604

(22) PCT Filed: Nov. 26, 2020

(86) PCT No.: PCT/KR2020/016996
§ 371 (c)(1),
(2) Date: May 27, 2022

(87) PCT Pub. No.: WO2021/118124
PCT Pub. Date: Jun. 17, 2021

(65) Prior Publication Data
US 2022/0298291 A1    Sep. 22, 2022

(30) Foreign Application Priority Data
Dec. 13, 2019 (KR) .......................... 10-2019-0167208

(51) Int. Cl.
*C08G 18/42* (2006.01)
*C08G 18/10* (2006.01)
(Continued)

(52) U.S. Cl.
CPC ......... *C08G 18/4247* (2013.01); *C08G 18/10* (2013.01); *C08G 18/3203* (2013.01); *C08G 18/4009* (2013.01)

(58) Field of Classification Search
CPC .............. C08G 18/3203; C08G 18/10; C08G 18/4009; C08G 18/4247
See application file for complete search history.

(56) References Cited

U.S. PATENT DOCUMENTS 5,120,813 A * 6/1992 Ward, Jr. ............. C08G 77/458
525/453
5,322,063 A * 6/1994 Allen ................. A61B 5/14865
436/817

(Continued)

FOREIGN PATENT DOCUMENTS

| CN | 101018599 | 8/2007 |
| CN | 102197519 | 9/2011 |

(Continued)

OTHER PUBLICATIONS

JPO, Office Action of JP 2022-535913 dated Jun. 30, 2023.

(Continued)

Primary Examiner — Michael L Leonard
(74) Attorney, Agent, or Firm — LEX IP MEISTER, PLLC

(57) ABSTRACT

The present invention relates to an amphiphilic polymer copolymer composed of a prepolymer polymerized by reacting polyol (P) and diisocyanate (R) and a chain-extender comprising one or more hydrophilic or hydrophobic functional groups ($E_1$ or $E_2$) and a method for preparing the same. Such a polymer is a biocompatible polymer as a thermoplastic polyurethane polymer, and it can be used as various medical polymers, and it has an advantage that a process can be simplified as it is easier to prepare and (Continued)

configure than the conventional blended medical polyurethane.

9 Claims, 4 Drawing Sheets

(51) Int. Cl.
    *C08G 18/32*         (2006.01)
    *C08G 18/40*         (2006.01)

(56) References Cited

U.S. PATENT DOCUMENTS

| | | | | |
|---|---|---|---|---|
| 6,323,299 | B1 * | 11/2001 | Handlin | C08G 18/4063 528/65 |
| 2008/0262613 | A1 * | 10/2008 | Gogolewski | C08G 18/3271 528/65 |
| 2011/0078832 | A1 | 3/2011 | Kocher et al. | |
| 2015/0368392 | A1 * | 12/2015 | Meltzer | C08G 18/6607 264/141 |

FOREIGN PATENT DOCUMENTS

| | | |
|---|---|---|
| CN | 102432992 | 5/2012 |
| CN | 102942664 | 2/2013 |
| CN | 103724574 | 4/2014 |
| CN | 104955860 | 9/2015 |
| CN | 107787230 | 3/2018 |
| CN | 108290992 | 7/2018 |
| CN | 109475661 | 3/2019 |
| CN | 110144033 | 8/2019 |
| GB | 1518687 | 7/1978 |
| JP | S51-52496 | 5/1976 |
| JP | 2000-119359 | 4/2000 |
| JP | 2002-531609 | 9/2002 |
| JP | 2011-524431 | 9/2011 |
| JP | 2017-075851 | 4/2017 |
| KR | 10-2017-0140329 | 12/2017 |
| KR | 10-2018-0109843 | 10/2018 |
| KR | 10-2018-0110538 | 10/2018 |
| WO | 2016-200956 | 12/2016 |

OTHER PUBLICATIONS

KIPO, Notice of Allowance of the corresponding Korean Patent Application No. 10-2019-0167208 dated Feb. 17, 2023.

EPO, extended European search report of application No. 20897774.4 dated Dec. 9, 2022.

Jie Lv et al. "Introduction to Biomedical Materials", Tongji University Press, Oct. 31, 2016.

KIPO, PCT Search Report & Written Opinion of Application No. PCT/KR2020/016996, dated Mar. 2, 2021.

Daisuke Aoki et al., "Design of Polyurethane Composed of Only Hard Main Chain with Oligo(ethylene glycol) Units as Side Chain Simultaneously Achieved High Biocompatible and Mechanical Properties", Macromolecules 2017, 50, 17, 6529-6538, Aug. 18, 2017.

* cited by examiner

[FIG. 1]
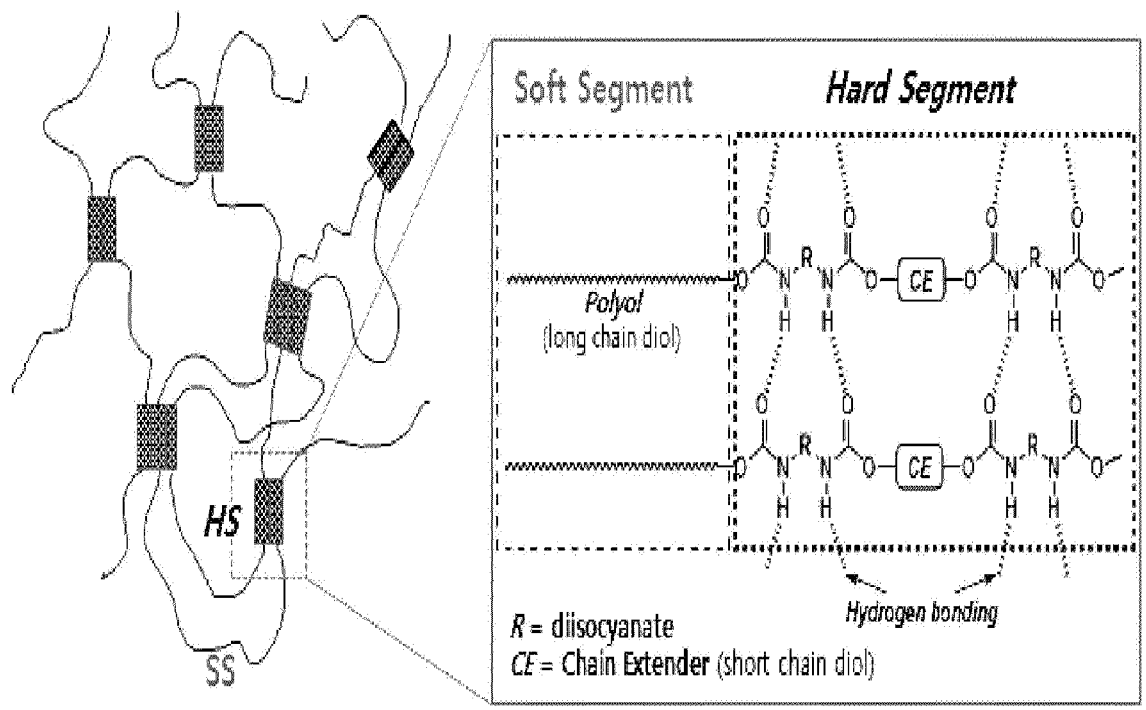

[FIG. 2]
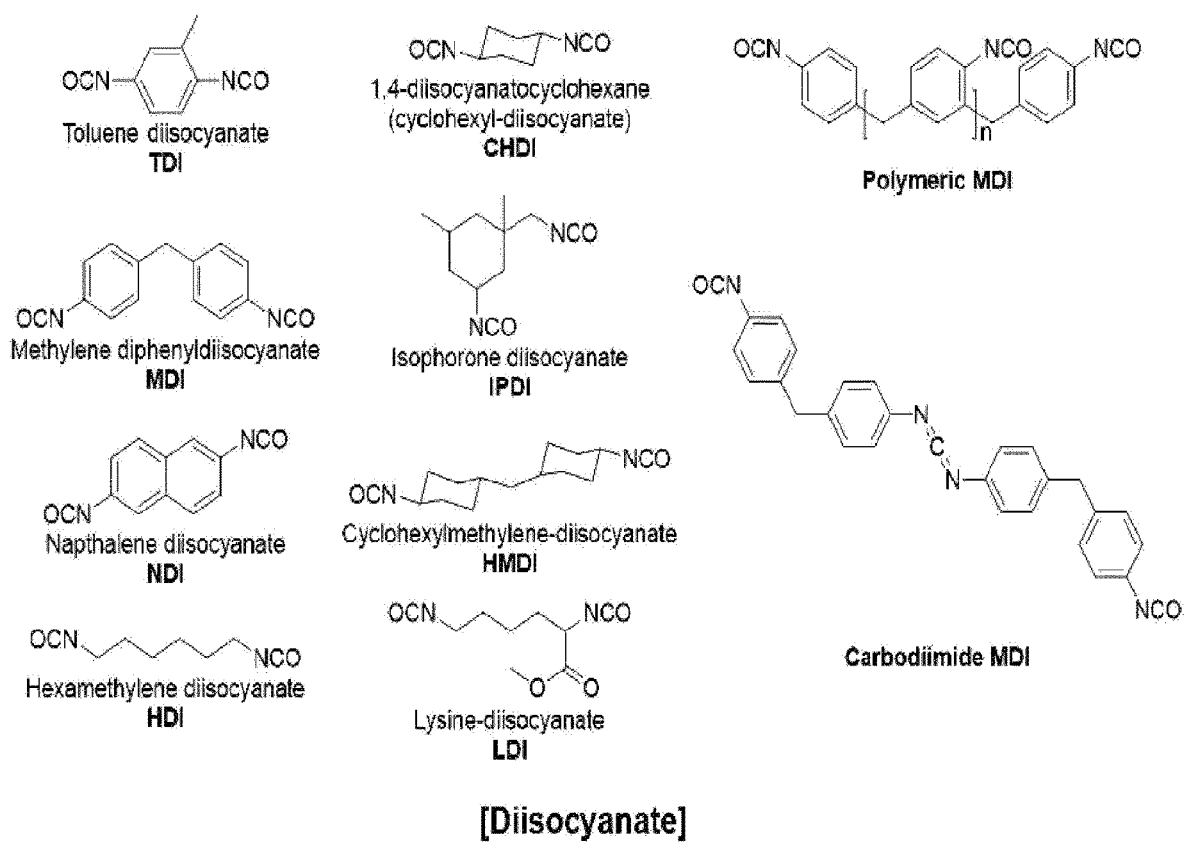
[Diisocyanate]

[FIG. 3]

Polyethers

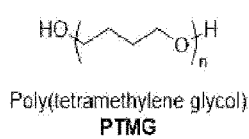
Poly(tetramethylene glycol)
PTMG

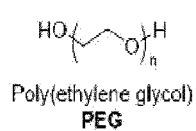
Poly(ethylene glycol)
PEG

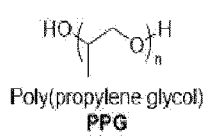
Poly(propylene glycol)
PPG

Polyesters

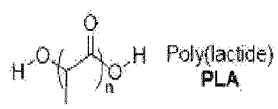
Poly(lactide)
PLA

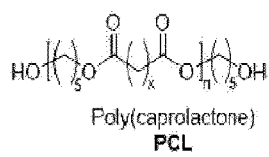
Poly(caprolactone)
PCL

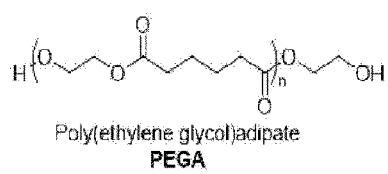
Poly(ethylene glycol)adipate
PEGA

Polycarbonates

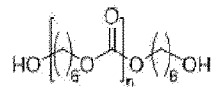
Poly(1,6-hexamethylene carbonate) diol
HMCD

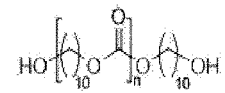
Poly(decamethylene carbonate) diol
HMCD

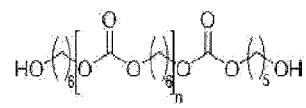
Polyhexamethylene-pentamethylene carbonate diol
PHMPMCD

Polysiloxane

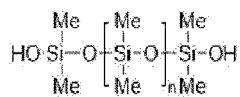
Poly(dimethylsiloxane) diol
PDMS

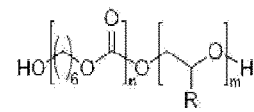
Oligocarbonate diol

[Polyol]

[FIG. 4]
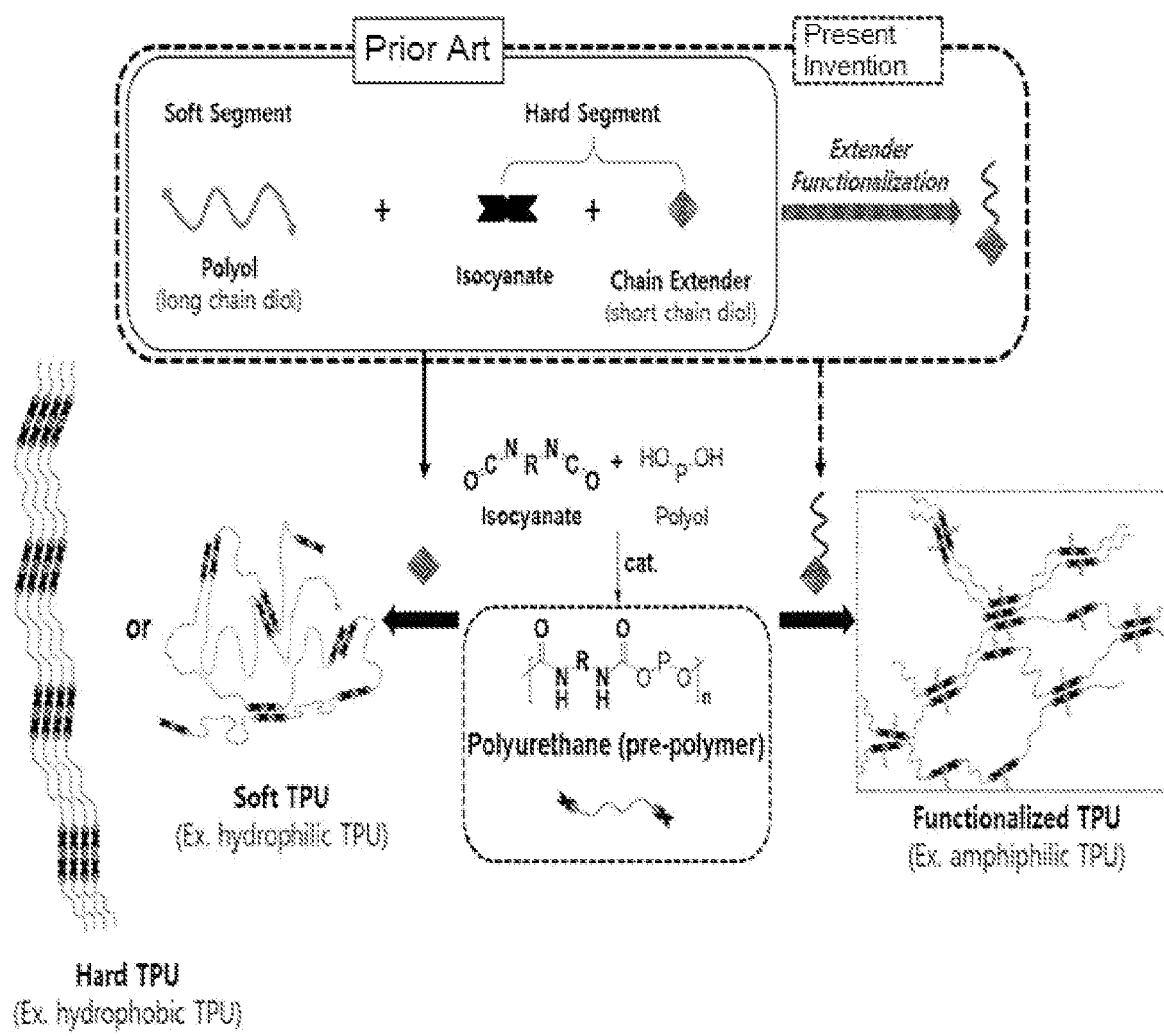

NON-MIXED AMPHIPHILIC THERMOPLASTIC POLYURETHANE, METHOD FOR PRODUCING SAME, AND IMPLANTABLE MEDICAL DEVICE INCLUDING SAME

TECHNICAL FIELD

The present invention relates to a novel chain extender to add the functionality of a thermoplastic polyurethane and a novel non-blended amphiphilic thermoplastic polyurethane (hereinafter, also referred to as "TPU") which can be used in an implantable medical device comprising the chain extender, and more specifically, it relates to a non-blended amphiphilic thermoplastic polyurethane in a single polymer form, which has water uptake and water permeability performance similar to the conventional blended amphiphilic thermoplastic polyurethane, by comprising a novel chain extender, and can solve difficulty in processing and preparation caused when the conventional blended amphiphilic thermoplastic polyurethane is used as a polymer for an implantable medical device, and can effectively produce and prepare a product with the same performance.

BACKGROUND ART

Thermoplastic polyurethanes (TPU) are kinds of polyurethane plastics with many properties including elasticity; transparency; and resistance to oil, grease and abrasion. Technically, they are thermoplastic elastomers composed of linear segment block copolymers composed of hard segments and soft segments (See FIGS. 1 and 2).

In relation to this, the conventional medical TPU is divided into hydrophilic or hydrophobic polymers and is used according to each use, and when both properties are required depending on the situation, inevitably two or more types of TPU having different properties are mixed and used. However, coating work for large-scale production and use of blended TPU in various working environments contain problems in practical application due to high cost and difficult condition, and the like.

Therefore, the present inventors have intensively studied with the main purpose of developing a polymer which introduces molecules and functional groups having different properties (hydrophilicity/hydrophobicity) to one TPU, and can replace the blended TPU only by using single TPU, and can adjust molecular weights and properties, and the like, as needed, and as a result, the present invention has been completed.

DISCLOSURE

Technical Problem

In order to solve the problem of the prior art as above, an object of the present invention is to provide an amphiphilic thermoplastic polyurethane comprising a chain extender having a hydrophilic or hydrophobic functional group.

In addition, an object of the present invention is to provide a method for preparing the amphiphilic thermoplastic polyurethane.

Technical Solution

In order to achieve the above objects, the present invention provides a non-blended amphiphilic thermoplastic polyurethane copolymer represented by Chemical formula 1 below, as an amphiphilic thermoplastic polyurethane comprising a chain extender having a hydrophilic or hydrophobic functional group ($E_1$ or $E_2$).

[Chemical formula 1]

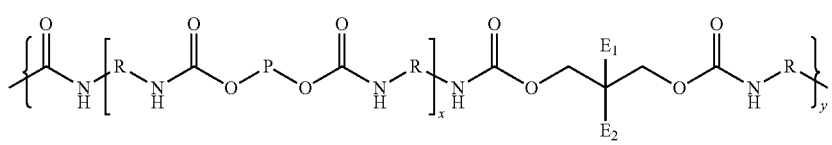

In the formula, $E_1$ or $E_2$ is each independently, one kind selected from the group consisting of a substituted or unsubstituted alkyl group having 1 to 10 carbon atoms, a substituted or unsubstituted ethylene oxide group having 2 to 20 carbon atoms, a substituted or unsubstituted alkoxy group having 1 to 20 carbon atoms, a substituted or unsubstituted cycloalkyl group having 1 to 20 carbon atoms, a substituted or unsubstituted aryl group having 7 to 20 carbon atoms, a substituted or unsubstituted heteroaryl group having 5 to 20 carbon atoms, a substituted or unsubstituted siloxane group having 5 to 20 carbon atoms, and the like, and $E_1$ and $E_2$ may be same or different, respectively; and P is polyol; and R is diisocyanate; and x is an integer of 2 to 50; and y is an integer of 2 to 100; and the molecular weight of the polyol (P) is 400 g/mol~10,000 g/mol.

The amphiphilic polyurethane according to the present invention is a thermoplastic polyurethane polymer copolymer as a block copolymer of polyol (P) and diisocyanate (R).

Advantageous Effects

The non-blended amphiphilic thermoplastic polyurethane according to the present invention has water absorption and water permeation performance similar to that of the conventional blended amphiphilic thermoplastic polyurethane copolymer by introducing a hydrophilic or hydrophobic group into a chain extender, and is not mixed, that is, a single type polyurethane, and it is excellent in that it can not only solve the problem in processing and preparation when the conventional blended amphiphilic thermoplastic polyurethane copolymer is used as an implantable polymer, but also efficiently produce and prepare products with equivalent performance.

BRIEF DESCRIPTION OF THE DRAWINGS

FIG. 1 is a schematic diagram showing the structure of thermoplastic polyurethane.

FIG. 2 is a figure showing specific examples of isocyanate which is a hard segment used in preparation of the thermoplastic polyurethane, which are 2,4-toluene diisocyanate (2,4-TDI), 4,4'-methylenediphenyl diisocyanate (4,4'-MDI), naphthalene diisocyanate (NDI), hexamethylene diisocyanate (HDI), cyclohexyl diisocyanate (CHDI), isophorone diisocyanate (IPDI), cyclohexylmethylene diisocyanate (HMDI), lysine diisocyanate (LDI), polymeric methylenediphenyl diisocyanate (Polymeric MDI) and carbodiimide methylenediphenyl diisocyanate (CMDI).

FIG. 3 is a figure showing specific examples of polyol which is a soft segment used in preparation of the thermoplastic polyurethane, which are polyethylene glycol (PEG), polypropylene glycol (PPG), polytetramethylene glycol (PTMG), poly(1,6-hexamethylene carbonate)diol (PHMCD), poly(decamethylene carbonate)diol (PDMCD), oligocarbonate diol, polyhexamethylene-pentamethylene carbonate diol (PHMPMCD), polylactide (PLA), polycaprolactone (PCL), polyethyleneglycol adipate (PEGA), and polydimethylsiloxane (PDMS).

FIG. 4 is a drawing which briefly shows difference between the present invention and the prior art.

BEST MODE

Hereinafter, the present invention will be described in detail.

The polyol (P) is a high molecular weight material prepared with an initiator and a monomer constituent unit, and when it is combined to polyurethane, it corresponds to a "soft segment" of the polymer, and it is commonly present in a coiled form. In a preferable aspect, the polyol (P) of the amphiphilic thermoplastic polyurethane according to the present invention is one or more kinds selected from the group consisting of polyethylene glycol (PEG), polytetramethylene glycol (PTMG), polycarbonate (PC), polyester, polymethylsiloxane (PDMS) and a combination thereof.

The diisocyanate and chain extender constitute a hard segment, and the hard segment is covalently bonded to the soft segment. In a preferable aspect, the diisocyanate (R) is one or more kinds selected from the group consisting of 4,4'-dicyclohexylmethane diisocyanate (HMDI), isophorone diisocyanate (IPDI), 1,4-cyclohexylmethane diisocyanate (CHDI), 4,4'-diphenylmethane diisocyanate (MDI), 2,4- or 2,6-toluene diisocyanate (TDI), carbodiimide-modified MDI, polymeric MDI, hexamethylene diisocyanate and a combination thereof.

The chain extender comprised in the amphiphilic thermoplastic polyurethane copolymer of the present invention is characterized by having a hydrophilic or hydrophobic functional group ($E_x$, X=1, 2) to give functionality (sensuality) to the amphiphilic thermoplastic polyurethane copolymer. This hydrophilic or hydrophobic functional group may be same or different in the thermoplastic polyurethane copolymer according to the present invention as above, and it may be one or more kinds selected from the group consisting of a substituted or unsubstituted alkyl group having 1 to 10 carbon atoms, a substituted or unsubstituted ethylene oxide group having 2 to 20 carbon atoms, a substituted or unsubstituted alkoxy group having 1 to 20 carbon atoms, a substituted or unsubstituted cycloalkyl group having 1 to 20 carbon atoms, a substituted or unsubstituted aryl group having 7 to 20 carbon atoms, a substituted or unsubstituted heteroaryl group having 5 to 20 carbon atoms, a substituted or unsubstituted siloxane group having 5 to 20 carbon atoms. Preferably, the hydrophilic or hydrophobic functional group may be composed of one of unsaturated alkyl groups having 1-10 carbon atoms; that is, methyl, ethyl, propyl, isopropyl, n-butyl, sec-butyl, t-butyl, pentyl, hexyl, cyclohexyl, heptyl, octyl or decane, but not limited thereto, and it may be one or more kinds selected from the group consisting of substituted or unsubstituted ethylene oxide groups having 2 to 20 carbon atoms; that is, ethylene oxide groups having 1-10 of the number of n in ($-OCH_2CH_2-$)$_n$, but not limited thereto, and it may be composed of one of substituted or unsubstituted alkoxy groups having 1 to 20 carbon atoms; that is, methoxy, ethoxy, propoxy, isopropoxy, butoxy, tert-butoxy, pentanoxy, hexanoxy, heptanoxy, octanoxy, decanoxy, alkyl-decanoxy (2-hexyl-1-decanoxy, 6-ethyl-3-decanoxy, etc.), dodecanoxy, alkyl-dodecanoxy, undecanoxy, alkyl-undecanoxy, allyloxy, cycloalkyloxy or cyclohexyloxy), but not limited thereto, and it may be composed of one of substituted or unsubstituted aryl or aryloxy groups having 7 to 20 carbon atoms; that is, phenyl, benzyl, tolyl, naphthalene, phenanthrenyl, other alkylphenyl and phenyloxy, benzyloxy, tolyloxy, naphthaleneoxy, phenanthreneoxy, and other alkoxyphenyl, but not limited thereto, and it may comprise, but consist of one of substituted or unsubstituted heteroaryl or heteroaryloxy groups having 5 to 20 carbon atoms; that is, monocyclic heteroaryl such as furyl, thiopenyl, pyrrolyl, imidazolyl, pyrazolyl, thiazolyl, thiadiazolyl, isothiazolyl, isooxazolyl, oxazolyl, oxadiazolyl, triazinyl, tetrazinyl, triazolyl, tetrazolyl, furazanyl, pyridyl, pyrazinyl, pyrimidinyl, pyridazinyl, and the like, and multicyclic heteroaryl such as benzofuranyl, benzothiopenyl, isobenzofuranyl, benzoimidazolyl, benzothiazolyl, benzoisothiazolyl, benzoisoxazolyl, benzooxazolyl, isoindolyl, indolyl, indazolyl, benzothiadiazolyl, quinolyl, isoquinolyl, cinnolinyl, quinazolinyl, quinoxalinyl, carbazolyl, phenanthridinyl, benzodioxolyl, and the like, and N-oxides corresponding thereto (for example, pyridyl N-oxide, quinolyl N-oxide), and tertiary salts thereof, but not limited thereto, and it may be one or more kinds selected from the group consisting of substituted or unsubstituted siloxane groups having 5 to 20 carbon atoms; that is, siloxane groups having the number of n of 2-10 in (-(Me)$_2$SiO—)$_n$, but not limited thereto.

In a specific aspect, the amphiphilic thermoplastic polyurethane copolymer according to the present invention may have the weight average molecular weight of 1,000 to 3,500,000 g/mol.

Specifically, the amphiphilic thermoplastic polyurethane copolymer according to the present invention may be represented by the structure selected from the group consisting of Chemical formulas 2 to 9 below.

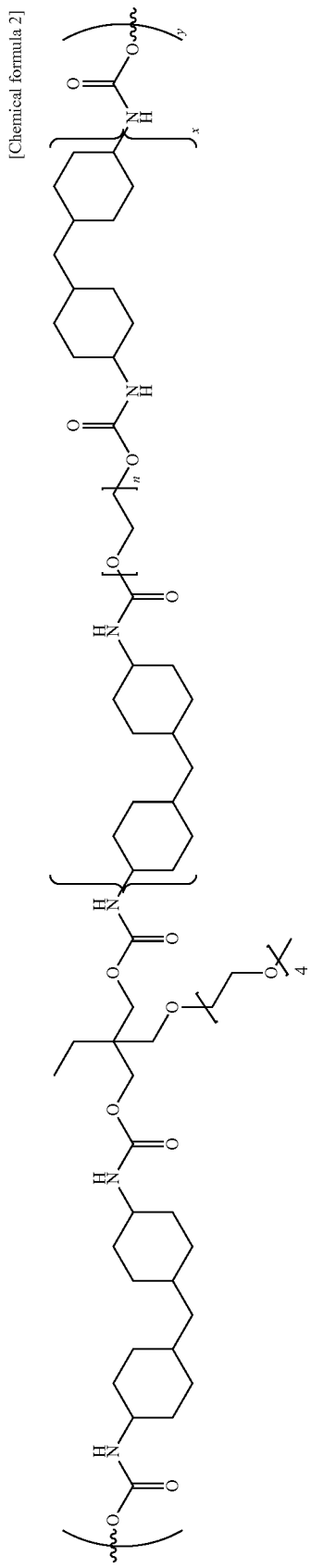
[Chemical formula 2]
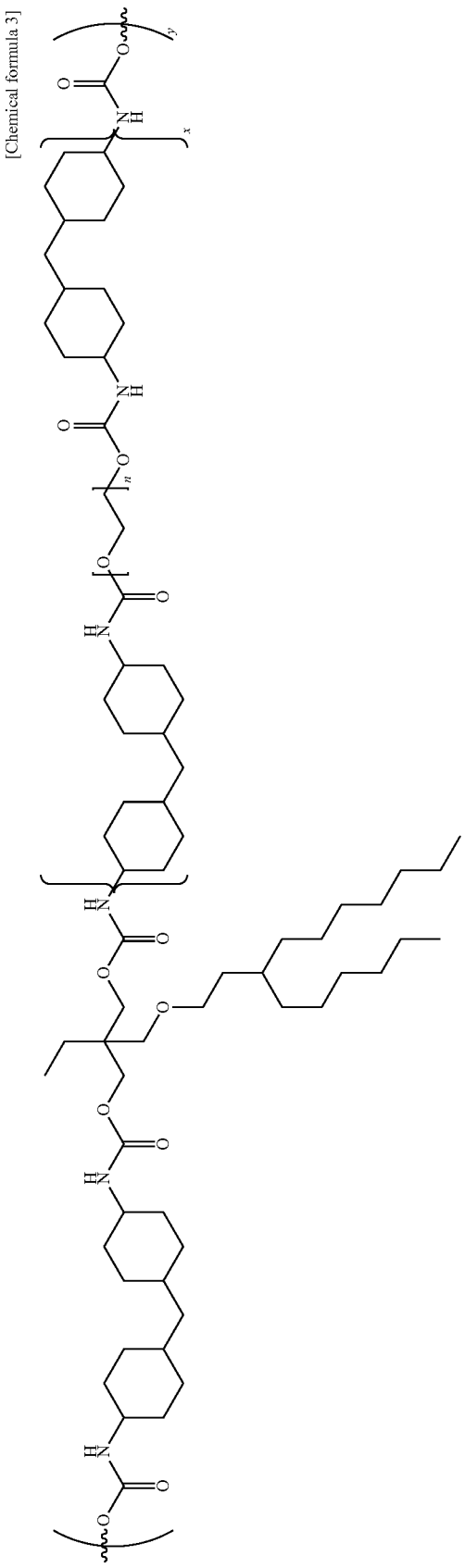
[Chemical formula 3]

-continued

[Chemical formula 4]

[Chemical formula 5]

-continued
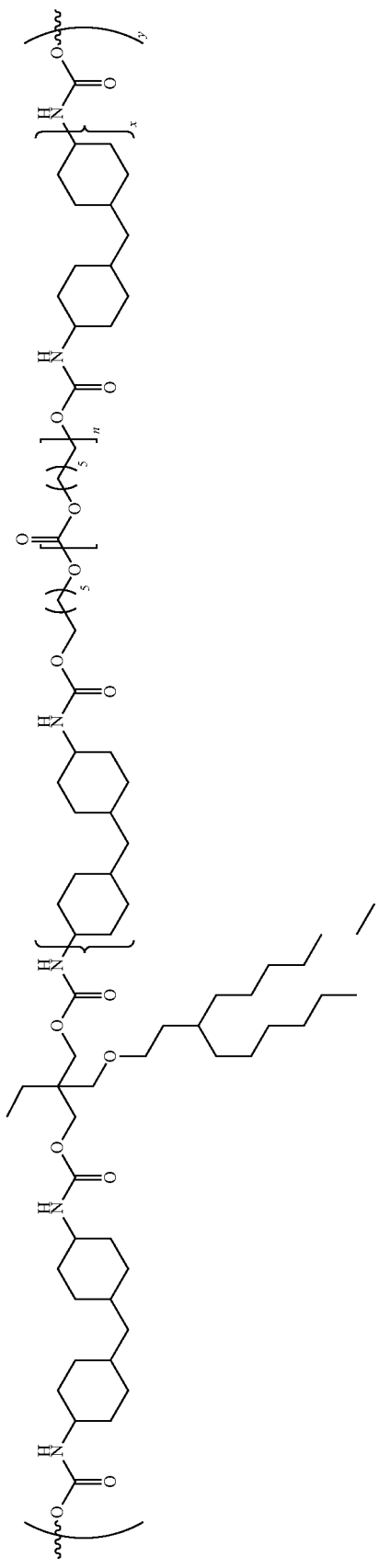
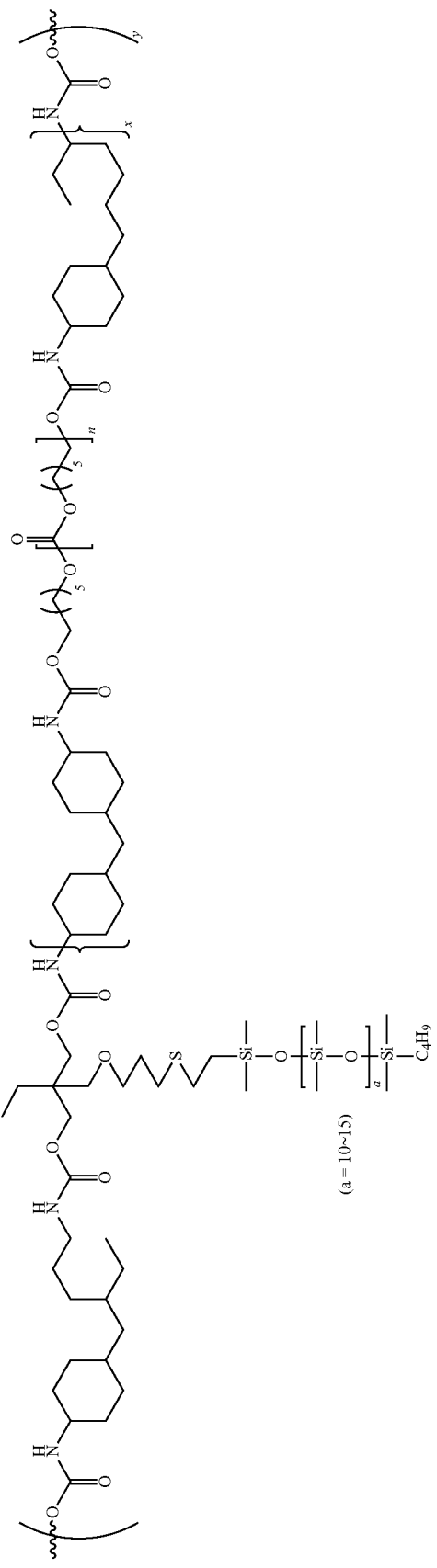

-continued
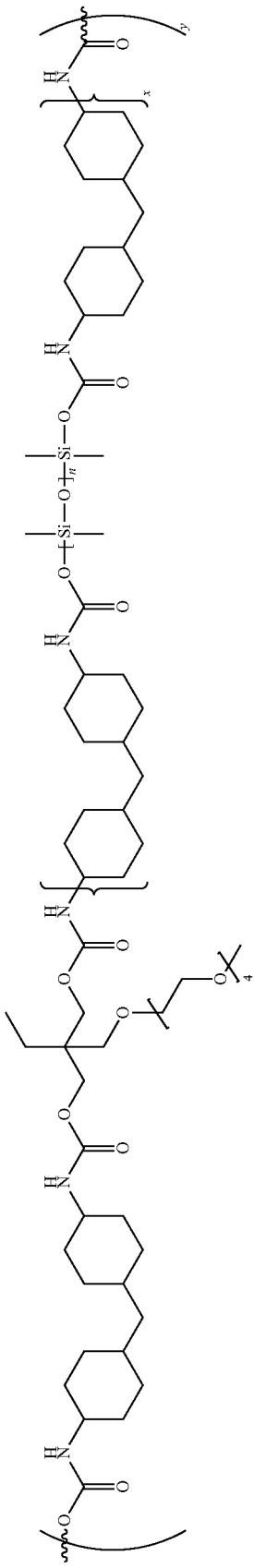
[Chemical formula 8]
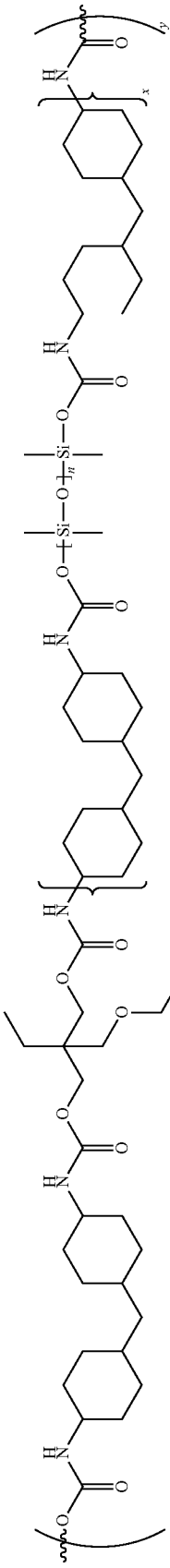
[Chemical formula 9]

In the Chemical formulas 2 to 9,
x and y are same as defined in Chemical formula 1 above, and
n is an integer of 10 to 250, and
a is an integer of 10 to 15.

As other aspect, the present invention relates to a method for preparing an amphiphilic thermoplastic polyurethane comprising the following steps:
(a) reacting polyol (P) and diisocyanate (R) to polymerize a prepolymer; and
(b) reacting the prepolymer constructed in the (a) with a chain extender comprising a hydrophilic or hydrophobic functional group ($E_1$ or $E_2$).

Preferably, the amphiphilic thermoplastic polyurethane has the structure of Chemical formula 1 above. Therefore, the polyol (P) may be polyether: that is, one or more kinds selected from the group consisting of polyethylene glycol (PEG), polypropylene glycol (PPG) and polytetramethylene glycol (PTMG), and in addition, it may be polycarbonate: that is, one or more kinds selected from the group consisting of poly(1,6-hexamethylene carbonate)diol (PHMCD), poly (decamethylene carbonate)diol (PDMCD), oligocarbonate diol and polyhexamethylene-pentamethylene carbonate diol (PHMPMCD), and in addition, it may be polyester; that is, one or more kinds selected from the group consisting of polylactide (PLA), polycaprolactone (PCL) and polyethyleneglycol adipate (PEGA), and moreover, it may be silicone; that is, one or more kinds selected from the group consisting of polydimethylsiloxane (PDMS), polyarylsiloxane and polyalkylsiloxane and a combination thereof. Furthermore, the average molecular weight of each polyol (P) composing the prepolymer is 400 g/mol to 10,000 g/mol, or the repeating unit n is 10 to 250 (FIG. 2).

In addition, the diisocyanate (R) may be one or more kinds selected from the group consisting of 4,4'-dicyclohexylmethane diisocyanate (HMDI), isophorone diisocyanate (IPDI), 1,4-cyclohexylmethane diisocyanate (CHDI), 4,4'-diphenylmethane diisocyanate (MDI), 2,4- or 2,6-toluene diisocyanate (TDI), carbodiimide-modified MDI, polymeric MDI, hexamethylene diisocyanate (HDI) and a combination thereof (FIG. 3).

Furthermore, the prepolymer in the (b) is reacted with a chain extender comprising a hydrophilic or hydrophobic functional group, and then, the chain extender is preferably represented by the structure of Chemical formula 10 below.

[Chemical formula 10]

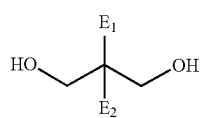

In the formula,
$E_1$ or $E_2$ is each independently, one kind selected from the group consisting of a substituted or unsubstituted alkyl group having 1 to 10 carbon atoms, a substituted or unsubstituted ethylene oxide group having 2 to 20 carbon atoms, a substituted or unsubstituted alkoxy group having 1 to 20 carbon atoms, a substituted or unsubstituted cycloalkyl group having 1 to 20 carbon atoms, a substituted or unsubstituted aryl group having 7 to 20 carbon atoms, a substituted or unsubstituted heteroaryl group having 5 to 20 carbon atoms, a substituted or unsubstituted siloxane group having 5 to 20 carbon atoms, and the like, and $E_1$ and $E_2$ may be same or different, respectively.

For example, this chain extender may be one or more kinds selected from the group consisting of Chemical formulas 11 to 13 below, but not limited thereto.

[Chemical formula 11]

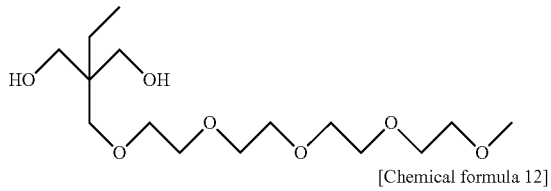

[Chemical formula 12]

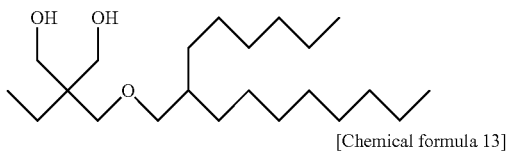

[Chemical formula 13]

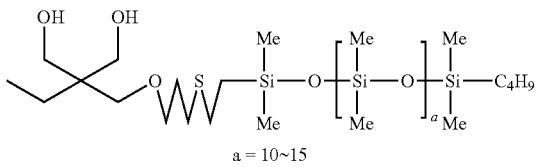

a = 10~15

In a preferable aspect, the equivalent ratio of the polyol (P) and diisocyanate (R) in the (a) may be 0.5 to 1:1 to 5 as polyol:diisocyanate. In addition, the equivalent ratio of the prepolymer and chain extender comprising a hydrophilic or hydrophobic functional group in the (b) may be 0.5 to 1:1 to 4 as prepolymer:chain extender comprising a hydrophilic or hydrophobic functional group. Furthermore, the polyol may be used in an amount of 30 to 97% by weight based on the total weight of the total amphiphilic thermoplastic polyurethane, and the diisocyanate may be used in an amount of 2 to 60% by weight based on the total weight of the total amphiphilic thermoplastic polyurethane, and the chain extender comprising a hydrophilic or hydrophobic functional group may be used in an amount of 1 to 20% by weight based on the total weight of the total amphiphilic thermoplastic polyurethane.

The amphiphilic thermoplastic polyurethane according to the present invention prepared by the above method can be used in a non-blended form, which is a single form, while exhibiting the equal level of performance, compared to a blended amphiphilic thermoplastic polyurethane prepared by mixing to show desired other water absorption and water permeation performance conventionally, because of comprising a chain extender comprising a hydrophilic or hydrophobic group, and thereby, it has an advantage of having no problem in processing and preparation which can be a problem when used as a polymer for particularly, an article or device used for medical use, preferably, an implantable medical article or device. Moreover, as the physical properties or performance of the prepared amphiphilic thermoplastic polyurethane differs depending on what kind of functional group is introduced into the chain extender, water absorption and/or water permeation performance may be easily introduced. The method for introducing a functional group to polyol or diisocyanate is difficult to commercialize due to difficulties in reproducibility, productivity and purification, and the like, whereas introduction of a functional group of a chain extender is advantageous for mass production because synthesis and purification are relatively easy.

In other aspect, the present invention provides an article comprising the amphiphilic thermoplastic polyurethane copolymer. This article may be prepared by a method of calendering, casting, coating, compounding, extrusion, foaming, laminating, blow molding, compression molding, injection molding, thermoforming, transfer molding, cast molding, rotational molding, spun or melt bonding, or a combination thereof for the thermoplastic polyurethane copolymer according to the present invention.

The article of the present invention may further comprise one or more coloring agents, anti-oxidants (including phenol resins, phosphite, thioester, and/or amine), anti-ozone degradation agents, stabilizing agents, lubricants, inhibitors, hydrolysis stabilizing agents, light stabilizing agents, benzotriazole UV absorbing agents, heat stabilizing agents, stabilizing agents for preventing discoloration, dyes, pigments, adjuvants or any combination thereof, together with the amphiphilic thermoplastic polyurethane copolymer.

Preferably, the article according to the present invention is a medical device or component, which may or may not be implantable, and for example, it may be one or more selected from the group consisting of an electrochemical biosensor, a pacemaker lead, an artificial organ, an artificial heart, a heart valve, an artificial tendon, an artery or vein, an implant, a medical back, a medical valve, a medical tube, a drug delivery device, a bioabsorbable implant, a medical prototype, a medical model, an orthodontic appliance, a bone, a dental appliance and a surgical instrument or a component thereof. More preferably, the article according to the present invention may be a protective film used in an electrochemical biosensor such as a continuous blood glucose monitoring sensor.

MODE FOR INVENTION

Hereinafter, the present invention will be described in more detail by the following examples. However, the following examples illustrate the present invention only, but the content of the present invention is not limited by the following examples.

Example 1: Preparation of Functionalized Amphiphilic Thermoplastic Polyurethane Copolymer According to the Present Invention 1. Synthesis of Chain Extender 1-1. Synthesis of 13-bromo-2,5,8,11-tetraoxatridecane

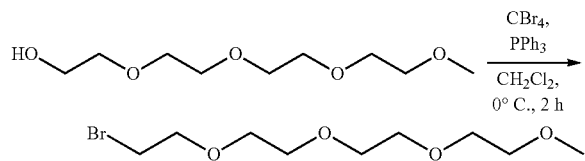

Tetraethylene glycol monomethylether 10.0 g (48 mmol) and carbon tetrabromide 19.1 g (57 mmol) were added to a 250 mL 2-neck round bottom flask, and they were dissolved in anhydrous dichloromethane (100 mL) under argon and then cooled to 0° C. To the mixture, triphenylphosphine 15.1 g (57 mmol) was added in portions for 15 minutes and stirred at a room temperature for 2 hours. After completing the reaction, the reaction mixture was extracted with water (100 mL) and dichloromethane (100 mL×3). The organic layer was collected and dried with magnesium sulfate and concentrated under reduced pressure, and after removing the solvent, the remains were dissolved with hexane. The remaining solution was purified by vacuum distillation (0.1 torr, 110° C.) to obtain a transparent colorless liquid. (12.0 g, 92%)

1-2. Synthesis of (5-Ethyl-2,2-dimethyl-1,3dioxan-5-yl)methanol

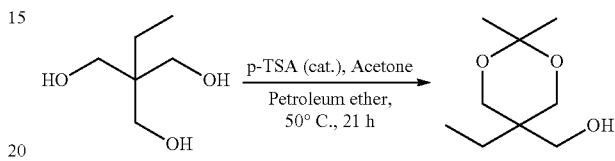

Trimethylolpropane 100 g (0.75 mol) and acetone 200 mL were added to a 1 L 2-neck round bottom flask, and they were dissolved in petroleum ether 300 mL. To this mixture, p-toluenesulfonic acid (0.13 g, 0.75 mmol) was added and heated to 50° C. and stirred for 21 hours. After completing the reaction, it was cooled to a room temperature, and the reaction solvent was removed by concentration under reduced pressure. The reaction mixture remained in the flask was purified by vacuum distillation (0.1 torr, 90° C.) to obtain a transparent colorless liquid. (93.0 g, 72%)

1-3. Synthesis of 2-ethyl-2-(2,5,8,11,14-pentaoxypentadecyl)propane-1,3-diol (CE1)

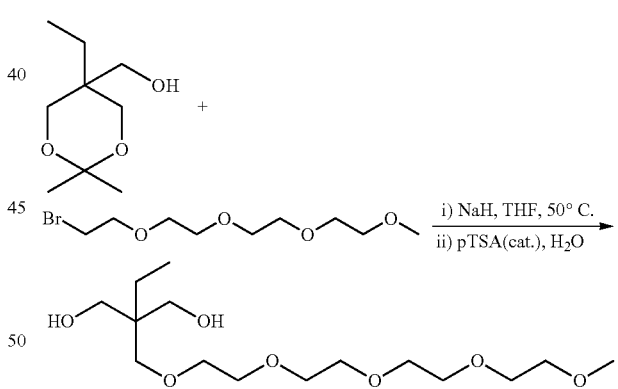

The (5-ethyl-2,2-dimethyl-1,3-dioxan-5-yl)methanol 5.2 g (30 mmol) prepared in Example 1-2 was dissolved in anhydrous tetrahydrofuran (100 mL) under argon in a 250 mL 2-neck round bottom flask, and then sodium hydride 1.5 g (38 mmol) was added. this mixture was stirred at a room temperature for 1 hour, and then the 13-bromo-2,5,8,11-tetraoxatridecane 9.7 g (38 mmol) prepared in Example 1-1 was added and heated to 70° C. under argon, and stirred for 24 hours. After completing the reaction, the reaction mixture was cooled to a room temperature, and the solvent, tetrahydrofuran was removed by concentration under reduced pressure and then it was extracted with water (100 mL) and ethyl acetate (100 mL×3). The extracted organic layer was collected and dried with magnesium sulfate and concentrated under reduced pressure to remove the solvent. The non-purified yellow liquid was mixed with a catalytic amount of p-toluenesulfonic acid and distilled water 200 ml in a 500 mL 2-neck round bottom flask, and heated to 100° C. and stirred for 24 hours. After completing the reaction, the reaction mixture was cooled to a room temperature and extracted with ethyl acetate (150 mL×3). The organic layer was collected and concentrated under reduced pressure and the solvent was removed, and then it was purified by column chromatography using ethyl acetate and hexane as developing solvents. (hexane:ethyl acetate=2:1 (10% methanol)) Finally, a transparent liquid, 2-ethyl-2-(2,5,8,11,14-pentaoxapentadecyl)propane-1,3-diol was obtained. (6.5 g, 67%)

1-4. Synthesis of 2-hexyldecyl-4-methylbenzosulfonate

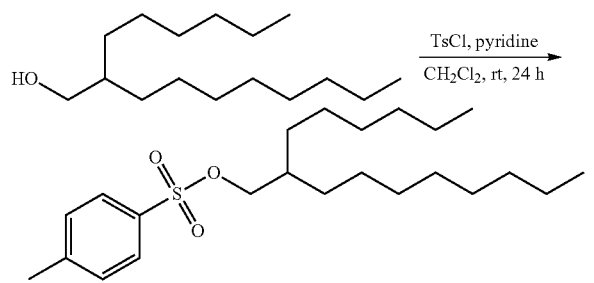

2-Hexyl-1-decanol 15.0 g (61 mmol) was added in a 1 L round bottom flask, and it was dissolved in dichloromethane (300 mL). After adding p-toluenesulfonyl chloride 23.0 g (123 mmol) and pyridine 7.5 mL (93 mmol) to this mixture, it was stirred at a room temperature for 24 hours. After completing the reaction, the final reaction mixture was extracted with water (40 mL) and dichloromethane (100 mL×3). The organic layer was collected and dried with magnesium sulfate and concentrated under reduced pressure to remove the solvent. The non-purified reaction mixture was purified by column chromatography using ethyl acetate and hexane as developing solvents. (Hexane:ethyl acetate=16:1) Finally, a colorless liquid, 2-hexyldecyl-4-methylbenzosulfonate was obtained (21.0 g, 88%).

1-5. Synthesis of 5-ethyl-5-(((2-hexyldecyl)methyl)-2,2-dimethyl-1,3-dioxane

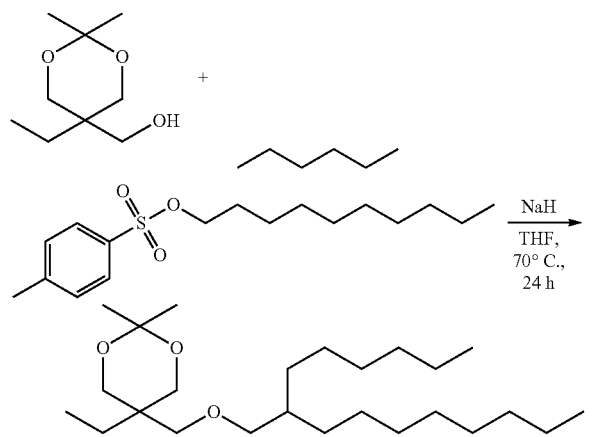

(5-Ethyl-2,2-dimethyl-1,3 dioxen-5-yl)methanol 1.00 g (5.7 mmol) was dissolved in anhydrous tetrahydrofuran under argon in a 250 mL 2-neck round bottom flask, and then sodium hydride 0.23 g (5.8 mmol) was added. This mixture was stirred at a room temperature for 1 hour, and then 2-hexyldecyl 4-methylbenzosulfonate 2.70 g (6.8 mmol) was added, and heated to 70° C. under argon and stirred for 24 hours. After completing the reaction, the reaction mixture was cooled to a room temperature and extracted with water (30 mL) and dichloromethane (60 mL×3). The organic layer was collected and dried with magnesium sulfate and concentrated under reduced pressure to remove the solvent, and then a yellow liquid 5-ethyl-5-4(2-hexyldecyl)methyl)-2,2-dimethyl-1,3-dioxane was obtained and the next reaction was progressed without purification.

1-6. Synthesis of 2-ethyl-2-(((2-hexyldecyl)oxyl) methyl)propene-1,3-diol (CE2)

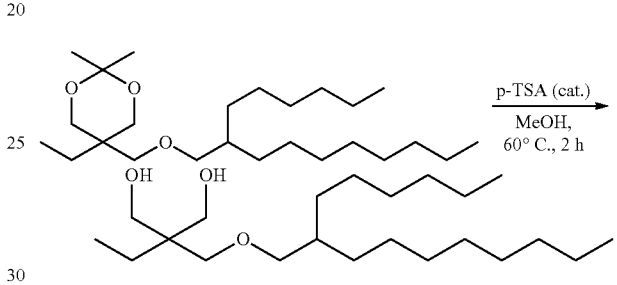

5-Ethyl-5-(((2-hexyldecyl)oxyl)methyl)-2,2-dimethyl-1,3-dioxane 1.0 g (2.5 mmol) was dissolved in 30 mL methanol in a 250 mL 2-neck round bottom flask, and p-toluenesulfonic acid was added and heated to 60° C. and stirred for 2 hours. After completing the reaction, the reaction mixture was cooled to a room temperature and extracted with water (30 mL) and ethyl acetate (50 mL×3). The organic layer was collected and dried with magnesium sulfate and concentrated under reduced pressure to remove the solvent. The non-purified reactant was purified by column chromatography using ethyl acetate and hexane as developing solvents. (Hexane:ethyl acetate=2:1) Finally, a yellow liquid, 2-ethyl-2-(((2-hexyldecyl)oxyl)methyl)propene-1,3-diol was obtained (1.1 g, 53%).

1-7. Synthesis of 1-butyl-5-(2-((3chloropropyl)thio) ethyl)polydimethylsiloxane

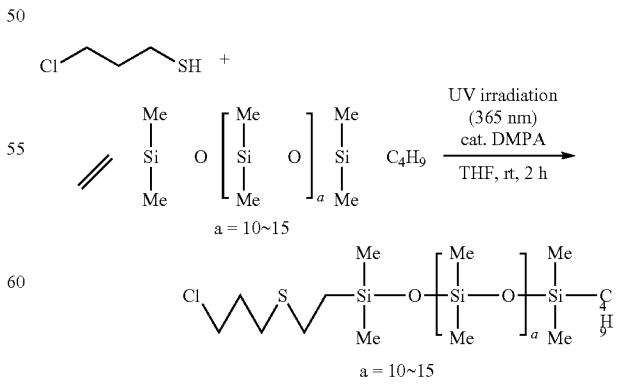

3-(Chloropropane)-1-thio) 1.2 g (11 mmol), terminal monovinylpoly(dimethylsiloxane) (molecular weight:

~1200 g/mol) 12 g (~10 mmol) and DMPA (11 mg, 0.04 mmol) were dissolved in 15 mL anhydrous tetrahydrofuran under argon in a 70 mL culture tube, and then argon degassing was conducted for 15 minutes. This reaction mixture was put in a UV reactor, and light of 315~400 nm was irradiated for 2 hours. After completing the reaction, the solvent was removed by reducing pressure, and then the remaining starting materials were removed by vacuum distillation. Finally, a transparent oil, 1-butyl-5-(2-((3chloropropyl)thio)ethyl)polydimethylsiloxane was obtained (13 g, 95%).

1-8. Synthesis of 1-butyl-5-(2-((3chloropropyl)thio)ethyl)-2,2-dimethyl-1,3-dioxane

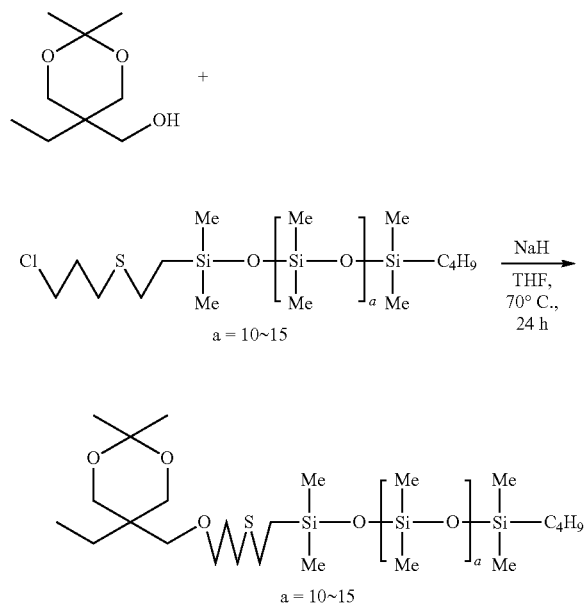

(5-Ethyl-2,2-dimethyl-1,3 dioxen-5-yl)methanol 1.00 g (5.7 mmol) was dissolved in anhydrous tetrahydrofuran under argon in a 250 mL 2-neck round bottom flask, and then sodium hydride 0.23 g (5.8 mmol) was added. This mixture was stirred at a room temperature for 1 hour, and then 1-butyl-5-(2-((3chloropropyl)thio)ethyl)polydimethylsiloxane 8.0 g (6.0 mmol) was added, and heated to 70° C. under argon, and stirred for 24 hours. After completing the reaction, the reaction mixture was cooled to a room temperature and extracted with water (30 mL) and dichloromethane (60 mL×3). The organic layer was collected and dried with magnesium sulfate and concentrated under reduced pressure to remove the solvent, and then a yellow liquid 1-butyl-5-(2-((3chloropropyl)thio)ethyl)-2,2-dimethyl-1,3-dioxane was obtained and the next reaction was progressed without purification.

1-9. Synthesis of 1-butyl-5-(2-((3chloropropyl)thio)ethyl)-2-ethylpropane-1,3-diol (CE3)

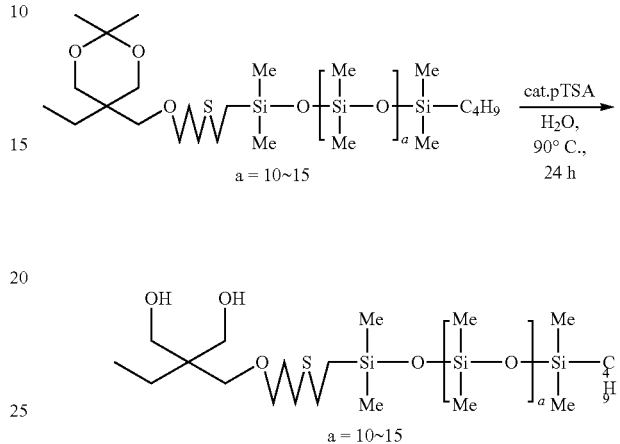

Non-purified 1-butyl-5-(2-((3chloropropyl)thio)ethyl)-2,2-dimethyl-1,3-dioxane 9.5 g and a catalytic amount of p-toluenesulfonic acid were added to a 500 mL 2-neck round bottom flask and mixed with 500 ml distilled water and stirred at 90° C. for 24 hours. After completing the reaction, the reaction mixture was cooled to a room temperature and extracted with ethyl acetate (100 mL×3). The organic layer was collected and dried with magnesium sulfate and concentrated under reduced pressure to remove the solvent. The non-purified reactant was purified by column chromatography using ethyl acetate and hexane as developing solvents. (Hexane:ethyl acetate=2:1) Finally, a sticky yellow oil 1-butyl-5-(2-((3chloropropyl)thio)ethyl)-2-ethylpropane-1,3-diol was obtained. (8.0 g, 2 steps yield 90%)

2. Preparation of Prepolymer Composed of Polyol and Diisocyanate and Synthesis of Polyurethane Copolymer Using Functionalized Chain Extender By reacting the chain extender prepared in Example 1 by the following method, the amphiphilic thermoplastic polyurethane copolymer according to the present invention was prepared.

2-1. Synthesis of Polyether Thermoplastic Polyurethane 2-1-1. Synthesis of PEG-PU-CE1

According to Reaction formula 1 below, PEG-PU-CE1 was synthesized.

[Reaction formula 1]

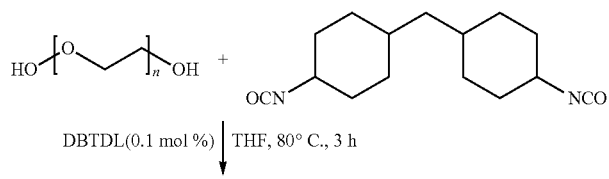

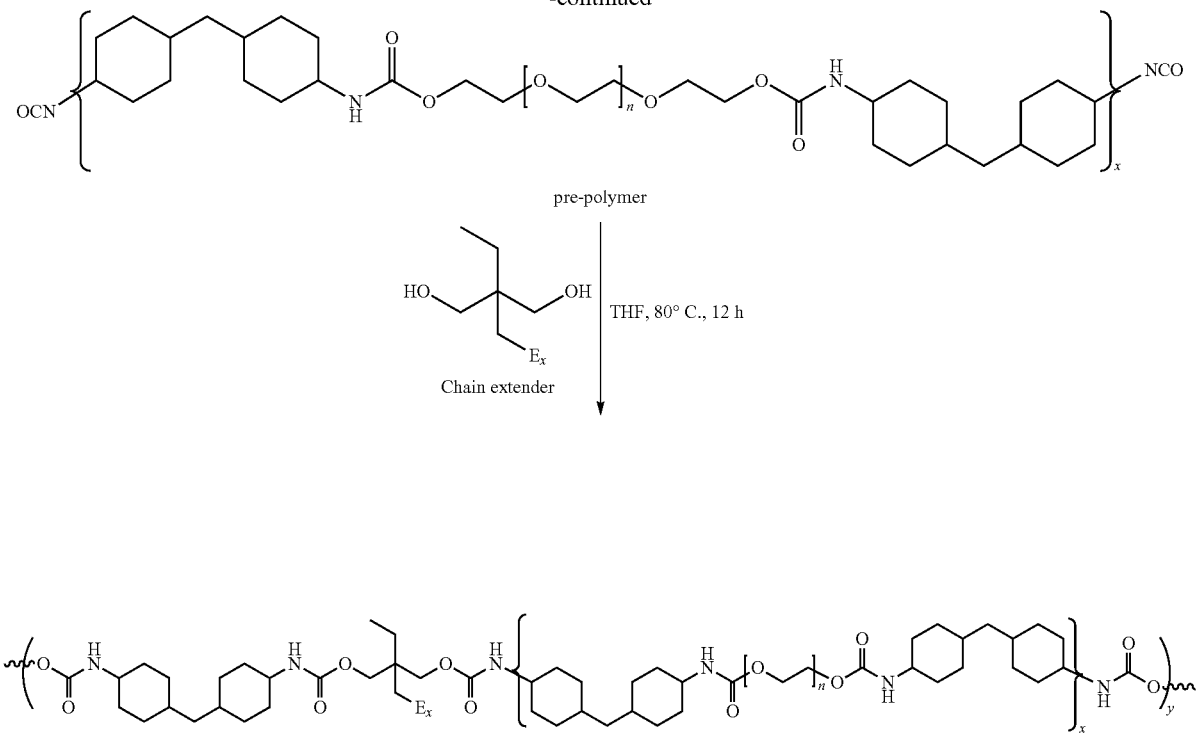

pre-polymer

Chain extender

THF, 80° C., 12 h (In the reaction formula, $E_x$ is $E_1$ or $E_2$, and n is any one of 10 to 250 integers, and x, y are same as defined in Chemical formula 1 above)

Before the reaction, polyethylene glycol was used after drying in a vacuum oven at 70° C. for 24 hours. Other liquid reagents were used after removing moisture using a 4 Å molecular sieve. An overhead stirrer, a cooler, a gas inlet pipe and a rubber septum were installed in a 1 L double jacket reactor, and polyethylene glycol ($M_n$=1,000 g/mol) 10.0 g (10 mmol) and 20 mL anhydrous tetrahydrofuran was added and argon degassing was conducted for 15 minutes. To the reactor, dibutyltin dilaurate 0.6 g and cyclohexylmethylene diisocyanate 5.2 g (20 mmol) which were catalysts were sequentially added using a gas tight syringe, and heated at 80° C. for 3 hours. The NCO (%) content of the polyurethane pre-polymer synthesized after the reaction was confirmed using back titration method. An overhead stirrer, a cooler, a gas inlet pipe and a rubber septum were installed in a 1 L double jacket reactor, and the prepared prepolymer was added, and then the synthesized chain extender CE1 (10 mmol) was slowly added using a syringe pump and heated at 80° C. for 12 hours. After completing the reaction, the synthesized polyurethane with high viscosity was dissolved in THF, and then it was slowly dropped in a beaker having diethyl ether and precipitated. The precipitated white solid was put in a vacuum oven and dried at a room temperature for 24 hours. Finally, a white solid amphiphilic thermoplastic polyurethane copolymer, PEG-PU-CE1 as below was prepared. (15 g)

[Chemical formula 2]

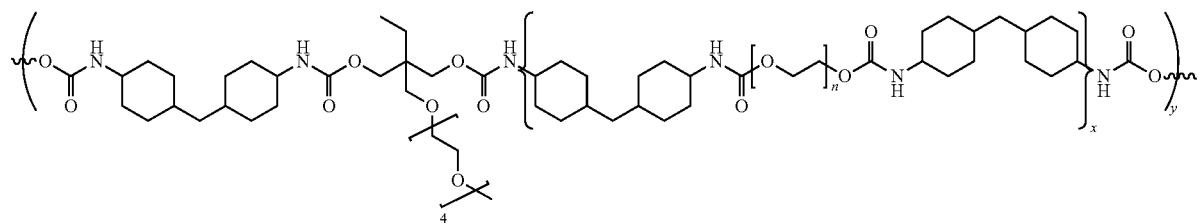

(In the formula, n is an integer of 10 to 250, and x and y are same as defined in Chemical formula 1 above)

2-1-2. Synthesis of PEG-PU-CE2

By the same method as the synthesis method of 2-1-1, PEG-PU-CE2 was prepared.

[Chemical formula 3]

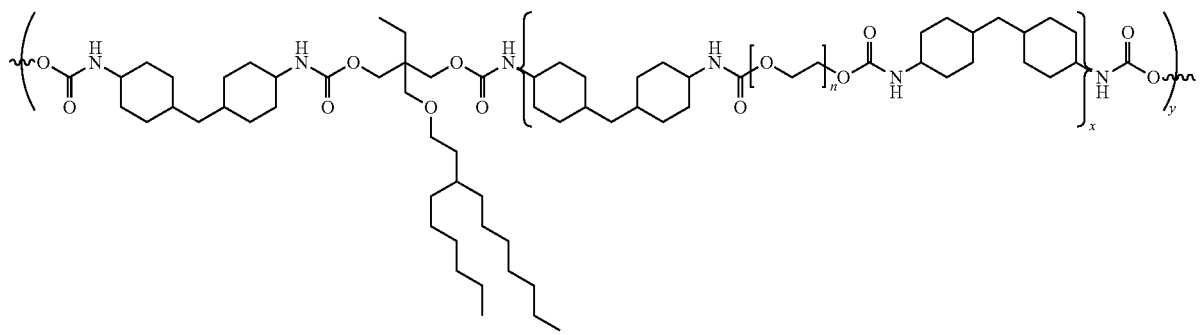

(In the formula, n is an integer of 10 to 250, and x and y are same as defined in Chemical formula 1 above)

2-1-3 Synthesis of PEG-PU-CE3

By the same method as the synthesis method of 2-1-1, PEG-PU-CE3 was prepared.

[Chemical formula 4]

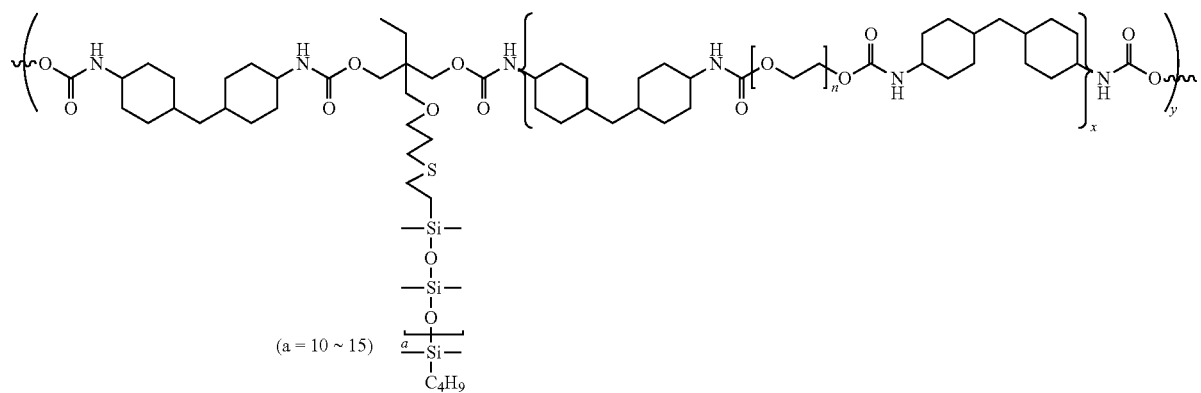

(In the formula, n is an integer of 10 to 250, and x and y are same as defined in Chemical formula 1 above)

2-2. Synthesis of Polycarbonate Thermoplastic Polyurethane 2-2-1. Synthesis of PC-PU-CE1

According to Reaction formula 2 below, PC-PU-CE1 was synthesized.

[Reaction formula 2]

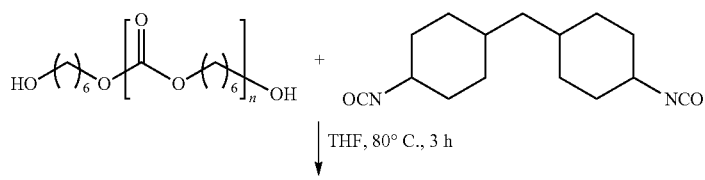

THF, 80° C., 3 h

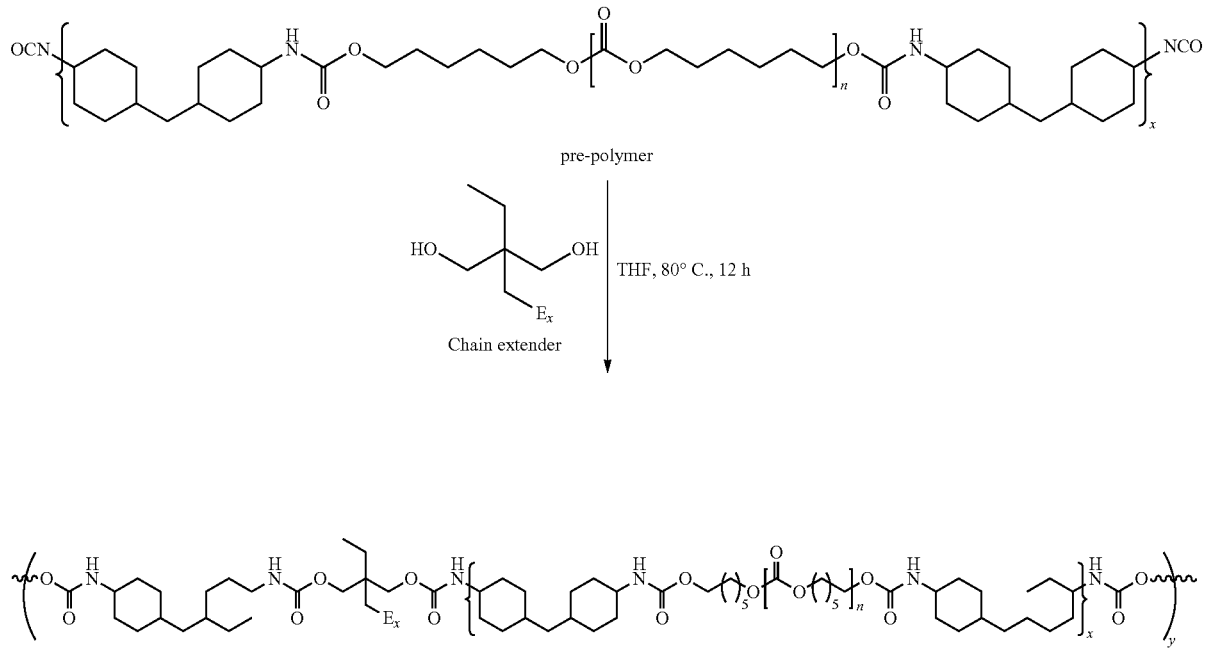

pre-polymer

Chain extender (In the formula, $E_x$ is $E_1$ or $E_2$, and n is an integer of 10 to 250, and x and y are same as defined in Chemical formula 1 above)

Before the reaction, polyhexamethylene carbonate was used after drying in a vacuum oven at 70° C. for 24 hours. Other liquid reagents were used after removing moisture using a 4 Å molecular sieve. An overhead stirrer, a cooler, a gas inlet pipe and a rubber septum were installed in a 1 L double jacket reactor, and polyhexamethylene carbonate ($M_n$=2,000 g/mol) 20.0 g (10 mmol) and 40 mL anhydrous tetrahydrofuran was added and argon degassing was conducted for 15 minutes. To the reactor, dibutyltin dilaurate 0.6 g and cyclohexylmethylene diisocyanate 5.2 g (20 mmol) which were catalysts were sequentially added using a gas tight syringe, and heated at 80° C. for 3 hours. The NCO (%) content of the polyurethane pre-polymer synthesized after the reaction was confirmed using back titration method. An overhead stirrer, a cooler, a gas inlet pipe and a rubber septum were installed in a 1 L double jacket reactor, and the prepared prepolymer was added, and then the synthesized chain extender CE1 (10 mmol) was slowly added using a syringe pump and heated at 80° C. for 12 hours. After completing the reaction, the synthesized polyurethane with high viscosity was dissolved in THF, and then it was slowly dropped in a beaker having diethyl ether and precipitated. The precipitated white solid was put in a vacuum oven and dried at a room temperature for 24 hours. Finally, a white solid amphiphilic thermoplastic polyurethane copolymer, PC-PU-CE1 as below was prepared. (23 g)

[Chemical formula 5]

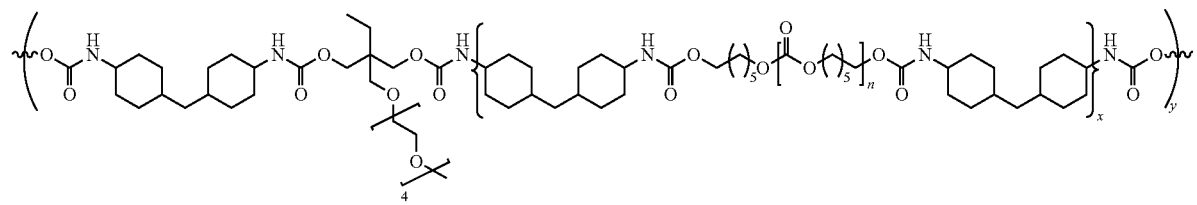

(In the formula, n is an integer of 10 to 250, and x and y are same as defined in Chemical formula 1 above)

2-2-2. Synthesis of PC-PU-CE2

By the same method as the synthesis method of 2-2-1, PC-PU-CE2 was prepared.

[Chemical formula 6]

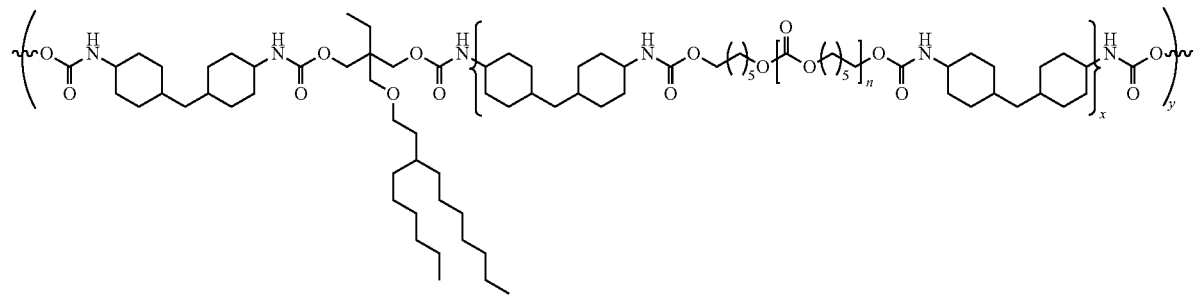

(In the formula, n is an integer of 10 to 250, and x and y are same as defined in Chemical formula 1 above)

2-2-3 Synthesis of PC-PU-CE3

By the same method as the synthesis method of 2-2-1, PC-PU-CE3 was prepared.

[Chemical formula 7]

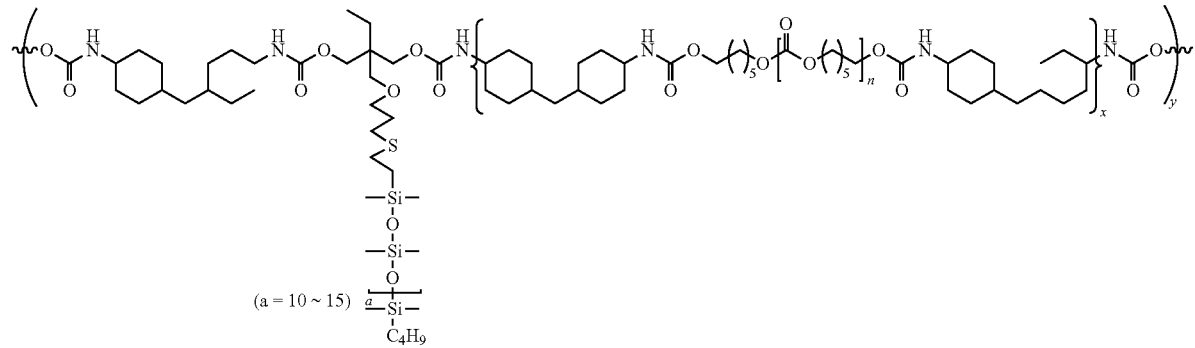

(In the formula, n is an integer of 10 to 250, and x and y are same as defined in Chemical formula 1 above)

2-3. Synthesis of Polydimethylsiloxane Thermoplastic Polyurethane 2-3-1. Synthesis of PDMS-PU-CE1

According to Reaction 3 below, PDMS-PU-CE1 was synthesized.

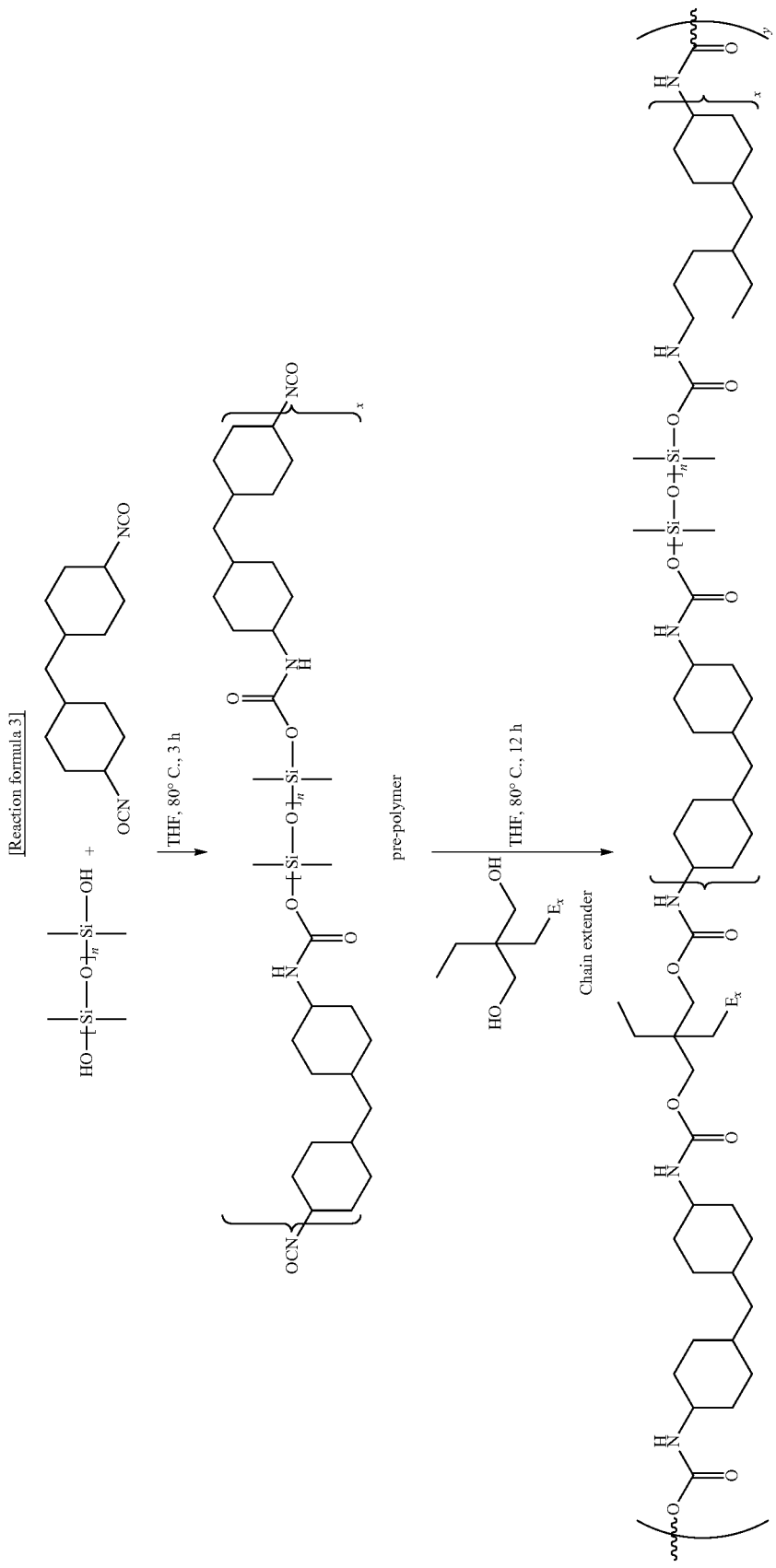

(In the formula, $E_x$ is $E_1$ or $E_2$, and n is an integer of 10 to 250, and x and y are same as defined in Chemical formula 1 above)

Before the reaction, polydimethylsiloxane was used after drying in a vacuum oven at 70° C. for 24 hours. Other liquid reagents were used after removing moisture using a 4 Å molecular sieve. An overhead stirrer, a cooler, a gas inlet pipe and a rubber septum were installed in a 1 L double jacket reactor, and polydimethylsiloxane ($M_n$=900 g/mol) 9.0 g (10 mmol) and 10 mL anhydrous tetrahydrofuran were added and argon degassing was conducted for 15 minutes. To the reactor, dibutyltin dilaurate 0.6 g and cyclohexylmethylene diisocyanate 5.2 g (20 mmol) which were catalysts were sequentially added using a gas tight syringe, and heated at 80° C. for 3 hours. The NCO (%) content of the polyurethane pre-polymer synthesized after the reaction was confirmed using back titration method. An overhead stirrer, a cooler, a gas inlet pipe and a rubber septum were installed in a 1 L double jacket reactor, and the prepared prepolymer was added, and then the synthesized chain extender CE1 (10 mmol) was slowly added using a syringe pump and heated at 80° C. for 12 hours. After completing the reaction, the synthesized polyurethane with high viscosity was dissolved in THF, and then it was slowly dropped in a beaker having diethyl ether and precipitated. The precipitated white solid was put in a vacuum oven and dried at a room temperature for 24 hours. Finally, a white solid amphiphilic thermoplastic polyurethane copolymer, PDMS-PU-CE1 as below was prepared. (12 g)

[Chemical formula 8]

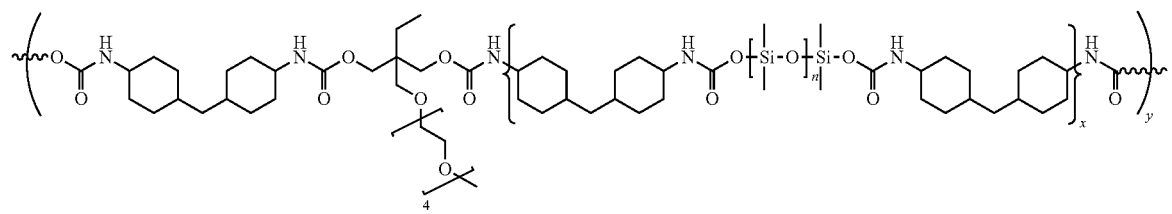

(In the formula, n is an integer of 10 to 250, and x and y are same as defined in Chemical formula 1 above)

2-3-2. Synthesis of PDMS-PU-CE2

By the same method as the synthesis method of 2-3-1, PDMS-PU-CE2 was prepared.

[Chemical formula 9]

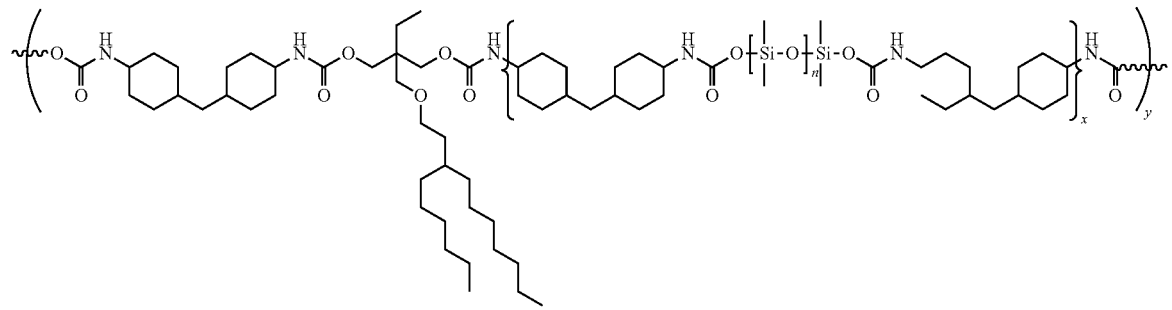

(In the formula, n is an integer of 10 to 250, and x and y are same as defined in Chemical formula 1 above)

The invention claimed is:
1. An amphiphilic thermoplastic polyurethane, wherein the amphiphilic thermoplastic polyurethane is represented by a structure selected from the group consisting of Chemical formulas 3, 5, 6, 7 and 9 below:

[Chemical formula 3]
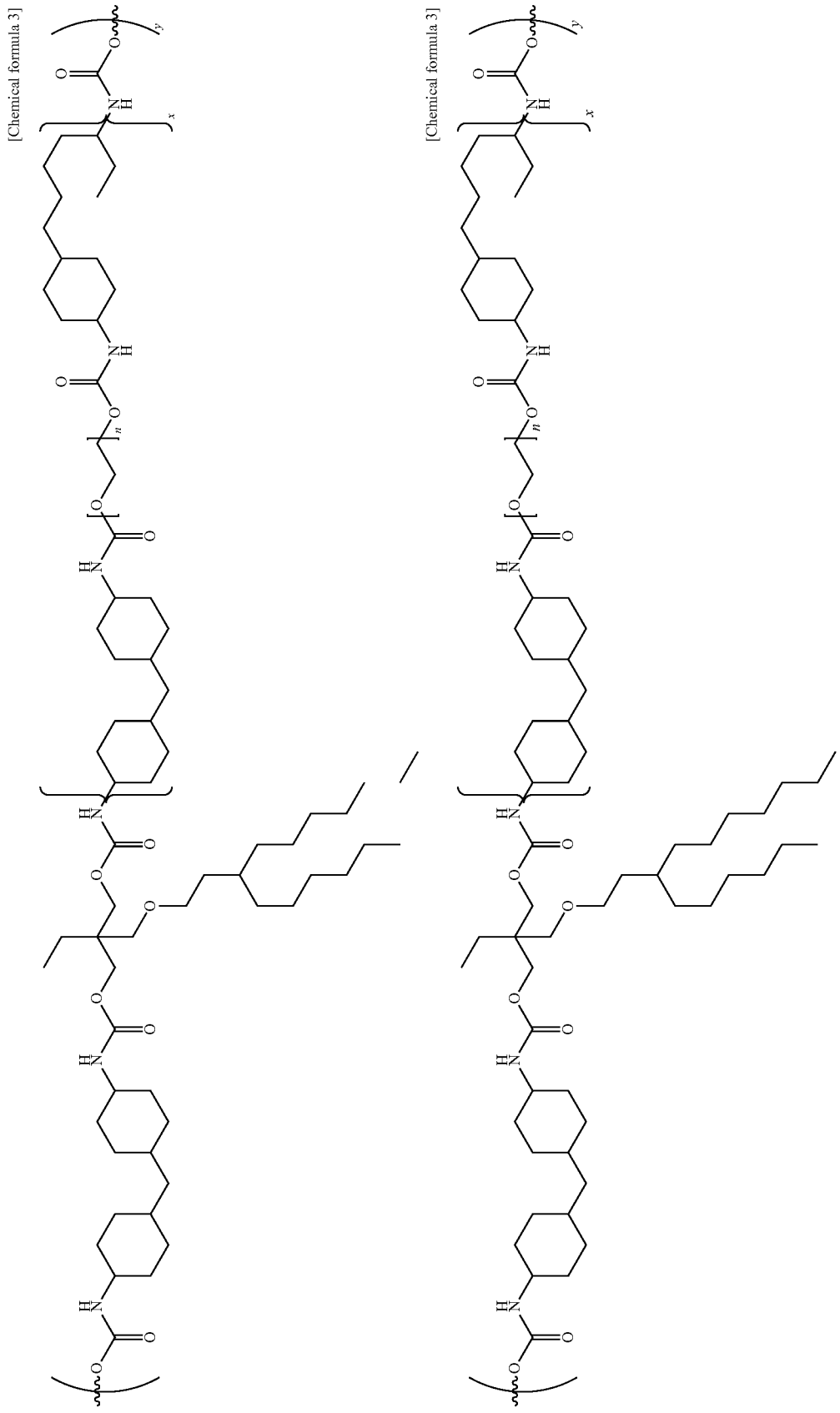

-continued
[Chemical formula 5]
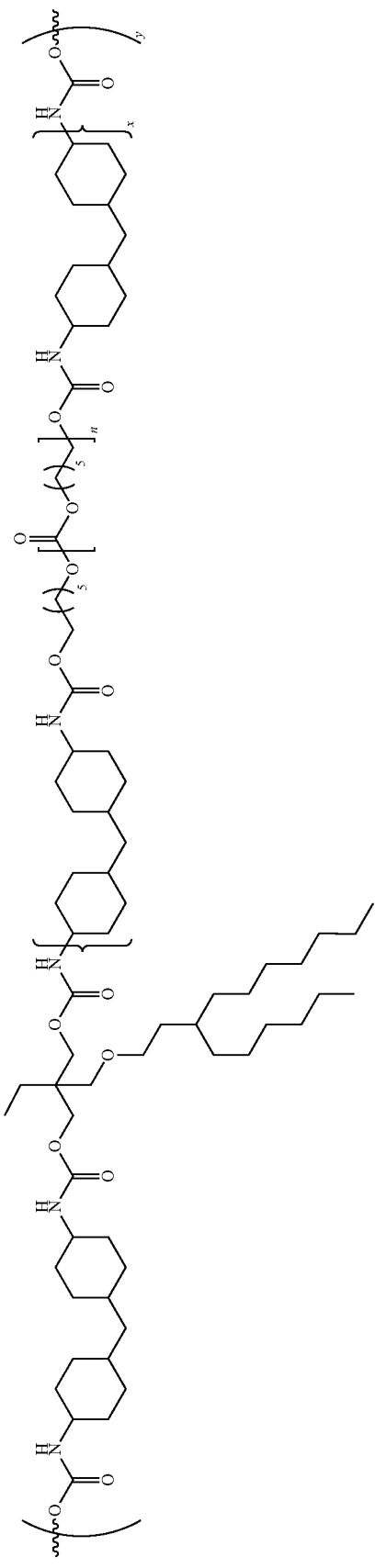
[Chemical formula 6]
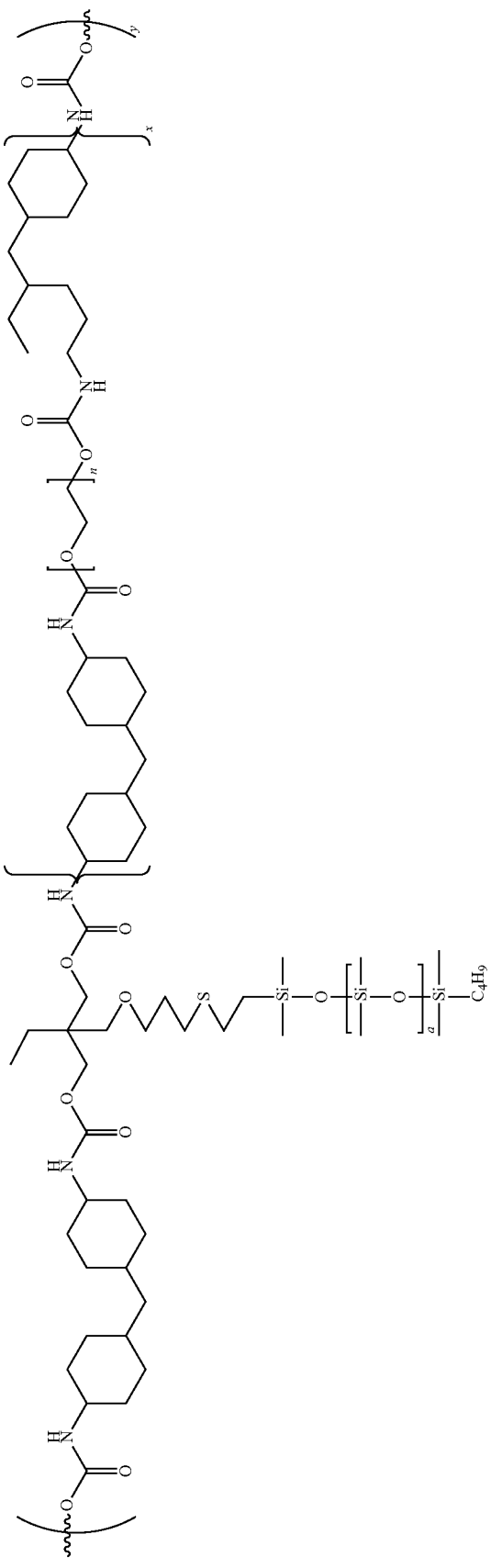

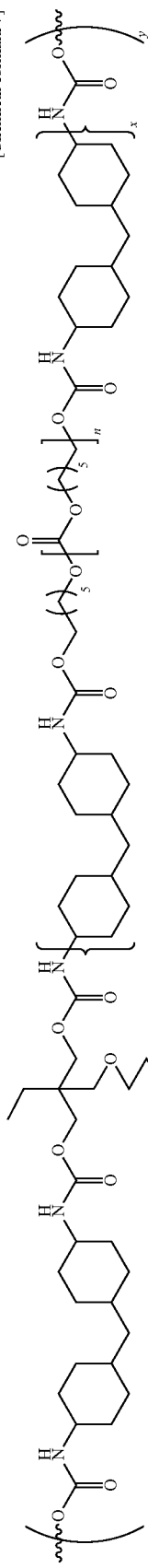
[Chemical formula 7]
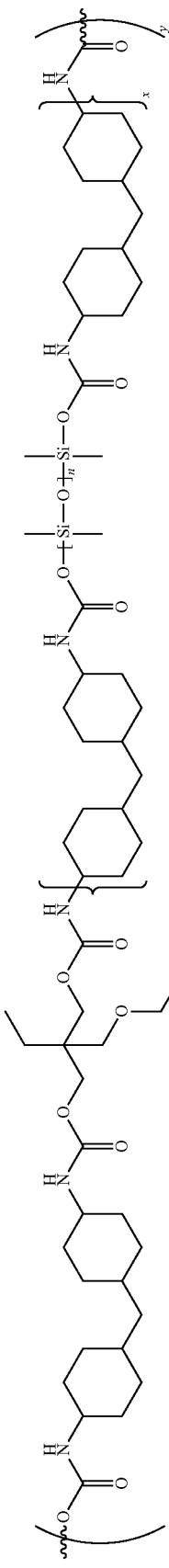
[Chemical formula 9]

wherein, in the Chemical formulas 2 to 9,
x is an integer of 2 to 50,
y is an integer of 2 to 100, n is an integer of 10 to 250, and
a is an integer of 10 to 15.

2. A method for preparing the amphiphilic thermoplastic polyurethane according to claim 1, comprising
(a) reacting polyol (P) and diisocyanate (R) to polymerize a prepolymer; and
(b) reacting the prepolymer constructed in the (a) with a chain extender,
wherein the chain extender is one or more kinds selected from the group consisting of Chemical formulas 12 and 13 below:

[Chemical formula 12]

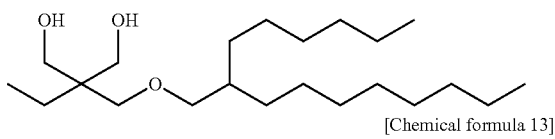

[Chemical formula 13]

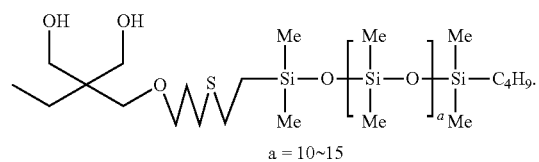

a = 10~15

3. The method for preparing the amphiphilic thermoplastic polyurethane according to claim 2, wherein the equivalent ratio of the polyol (P) and diisocyanate (R) in the (a) is 0.5 to 1:1 to 5 as polyol:diisocyanate.

4. The method for preparing the amphiphilic thermoplastic polyurethane according to claim 2, wherein the equivalent ratio of the prepolymer and chain extender comprising a hydrophilic or hydrophobic functional group in the (b) is 0.5 to 1:1 to 4 as prepolymer:chain extender comprising a hydrophilic or hydrophobic functional group.

5. The method for preparing the amphiphilic thermoplastic polyurethane according to claim 2, wherein the polyol (P) is used in an amount of 30 to 97% by weight based on the total weight of the total amphiphilic thermoplastic polyurethane.

6. The method for preparing the amphiphilic thermoplastic polyurethane according to claim 2, wherein the diisocyanate is used in an amount of 2 to 60% by weight based on the total weight of the total amphiphilic thermoplastic polyurethane.

7. The method for preparing the amphiphilic thermoplastic polyurethane according to claim 2, wherein the chain extender comprising a hydrophilic or hydrophobic functional group is used in an amount of 1 to 20% by weight based on the total weight of the total amphiphilic thermoplastic polyurethane.

8. An article comprising the amphiphilic thermoplastic polyurethane according to claim 1.

9. The article according to claim 8, wherein the article is an electrochemical sensor.

* * * * *